(12) United States Patent
Chun et al.

(10) Patent No.: US 8,155,069 B2
(45) Date of Patent: Apr. 10, 2012

(54) METHOD OF TRANSMITTING AND RECEIVING SCHEDULING INFORMATION IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 12/448,778

(22) PCT Filed: Jan. 9, 2008

(86) PCT No.: PCT/KR2008/000139
§ 371 (c)(1),
(2), (4) Date: Jul. 7, 2009

(87) PCT Pub. No.: WO2008/084986
PCT Pub. Date: Jul. 17, 2008

(65) Prior Publication Data
US 2010/0027488 A1    Feb. 4, 2010

Related U.S. Application Data

(60) Provisional application No. 60/884,198, filed on Jan. 9, 2007.

(30) Foreign Application Priority Data

Jan. 9, 2008  (KR) .................. 10-2008-0002548

(51) Int. Cl.
*H04W 4/00* (2009.01)

(52) U.S. Cl. ..................... 370/329; 370/436

(58) Field of Classification Search .......... 370/315–327, 370/329–338, 436–440
See application file for complete search history.

(56) References Cited

U.S. PATENT DOCUMENTS

| 6,470,391 | B2 | 10/2002 | Takamoto et al. |
| 6,697,347 | B2 | 2/2004 | Ostman et al. |
| 6,778,501 | B1 | 8/2004 | Malmgren et al. |
| 7,006,464 | B1 | 2/2006 | Gopalakrishnan et al. |
| 7,158,504 | B2 | 1/2007 | Kadaba et al. |
| 7,295,573 | B2 | 11/2007 | Yi et al. |

(Continued)

FOREIGN PATENT DOCUMENTS

CN    1595362    3/2005

(Continued)

OTHER PUBLICATIONS

3GPP TR 25.814 V1.5.0, Myung Cheul, May 2006, V1.5.0, Release 7.*

(Continued)

*Primary Examiner* — Pao Sinkantarakorn
*Assistant Examiner* — Iqbal Zaidi
(74) *Attorney, Agent, or Firm* — McKenna Long & Aldridge LLP (57) ABSTRACT

A method of transmitting scheduling information in a network of a wireless communication system which uses multiple carriers includes allocating at least one sub-region to a specific user equipment among an entire control information transmission region used in one cell, the entire control information transmission region comprising at least two sub-regions, and transmitting scheduling information for data to be transmitted to the user equipment, through at least one sub-region allocated to the specific user equipment.

11 Claims, 10 Drawing Sheets

U.S. PATENT DOCUMENTS

| | | | |
|---|---|---|---|
| 7,359,924 B2 | 4/2008 | Balachandran et al. | |
| 7,542,457 B2 | 6/2009 | Wu | |
| 7,646,742 B2 | 1/2010 | Petrovic et al. | |
| 7,764,661 B2 | 7/2010 | Heo et al. | |
| 7,801,563 B2 | 9/2010 | Hara et al. | |
| 7,912,471 B2 | 3/2011 | Kodikara Patabandi et al. | |
| 2002/0170013 A1 | 11/2002 | Bolourchi et al. | |
| 2003/0040314 A1 | 2/2003 | Hogan et al. | |
| 2003/0095519 A1 | 5/2003 | Kuo et al. | |
| 2003/0152083 A1 | 8/2003 | Nagata et al. | |
| 2003/0157953 A1 | 8/2003 | Das et al. | |
| 2003/0181221 A1 | 9/2003 | Nguyen | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0103435 A1 | 5/2004 | Yi et al. | |
| 2004/0228294 A1 | 11/2004 | Kim et al. | |
| 2004/0266461 A1 | 12/2004 | Beckmann et al. | |
| 2005/0039101 A1 | 2/2005 | Torsner | |
| 2005/0083943 A1 | 4/2005 | Lee et al. | |
| 2005/0111487 A1 | 5/2005 | Matta et al. | |
| 2005/0207343 A1 | 9/2005 | Han, II | |
| 2005/0220116 A1 | 10/2005 | Ahn et al. | |
| 2005/0237960 A1 | 10/2005 | Kim | |
| 2006/0018294 A1 | 1/2006 | Kynaslahti et al. | |
| 2006/0067238 A1 | 3/2006 | Olsson et al. | |
| 2006/0092911 A1 | 5/2006 | Hwang et al. | |
| 2006/0092973 A1 | 5/2006 | Petrovic et al. | |
| 2006/0114877 A1 | 6/2006 | Heo et al. | |
| 2006/0140158 A1 | 6/2006 | Terry | |
| 2006/0148411 A1 | 7/2006 | Cho et al. | |
| 2006/0203760 A1 | 9/2006 | Fukui et al. | |
| 2006/0245386 A1 | 11/2006 | Hu | |
| 2006/0251019 A1 | 11/2006 | Dalsgaard et al. | |
| 2006/0251105 A1 | 11/2006 | Kim et al. | |
| 2007/0047452 A1 | 3/2007 | Lohr et al. | |
| 2007/0064602 A1 | 3/2007 | Jiang | |
| 2007/0091810 A1 | 4/2007 | Kim et al. | |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1 | 3/2008 | Wu | |
| 2008/0056183 A1* | 3/2008 | Gorokhov et al. | 370/329 |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 | 7/2008 | Wu et al. | |
| 2008/0273610 A1 | 11/2008 | Malladi et al. | |
| 2009/0028123 A1 | 1/2009 | Terry et al. | |
| 2009/0221293 A1 | 9/2009 | Petrovic et al. | |
| 2009/0268676 A1 | 10/2009 | Wigard et al. | |
| 2010/0091721 A1 | 4/2010 | Larmo et al. | |
| 2011/0190001 A1 | 8/2011 | Kodikara Patabandi et al. | |

FOREIGN PATENT DOCUMENTS

| | | |
|---|---|---|
| CN | 1805596 | 7/2006 |
| EP | 1 432 261 | 6/2004 |
| EP | 1724948 A1 | 11/2006 |
| EP | 1 755 355 | 2/2007 |
| EP | 1 843 504 | 10/2007 |
| EP | 1 845 649 | 10/2007 |
| EP | 1 845 650 | 10/2007 |
| JP | 2002-247042 | 8/2002 |
| JP | 2002-527945 | 8/2002 |
| JP | 2002-290413 | 10/2002 |
| JP | 2003-304574 | 10/2003 |
| JP | 2005-525065 | 8/2005 |
| JP | 2006-121394 | 5/2006 |
| JP | 2006-148490 | 6/2006 |
| JP | 2006-237897 | 9/2006 |
| JP | 2006-524444 | 10/2006 |
| JP | 2006-524969 | 11/2006 |
| JP | 2006-352708 | 12/2006 |
| JP | 2009-535957 | 10/2009 |
| RU | 2004-132193 | 4/2005 |
| RU | 2005-116242 A | 11/2005 |
| RU | 2004-126160 | 1/2006 |
| WO | WO 97/11566 | 3/1997 |
| WO | WO 98/24250 | 6/1998 |
| WO | WO 02/093296 A2 | 11/2002 |
| WO | WO 03/084095 A1 | 10/2003 |
| WO | WO 03/085874 A1 | 10/2003 |
| WO | WO 03/096149 | 11/2003 |
| WO | WO 03/096567 | 11/2003 |
| WO | WO 2004/017541 A1 | 2/2004 |
| WO | WO 2004/042952 | 5/2004 |
| WO | WO 2005/119941 | 12/2005 |
| WO | WO 2005/125252 | 12/2005 |
| WO | WO 2006/022876 A1 | 3/2006 |
| WO | WO 2006/105333 A1 | 10/2006 |
| WO | WO 2006/118418 | 11/2006 |
| WO | WO 2007/068304 | 6/2007 |

OTHER PUBLICATIONS

"Universal Mobile Telecommunications System (UMTS); User Equipment (UE) procedures in idle mode and procedures for cell reselection in connected mode (3GPP TS 25.304 version 7.1.0 Release 7); ETSI TS 125 304", ETSI Standards, Dec. 2006, XP014039981.

"Universal Mobile Telecommunications System (UMTS); High Speed Downlink Packet Access (HSDPA); Overall description; Stage 2 (3GPP TS 25.308 version 7.1.0 Release 7); ETSI TS 125 308", ETSI Standards, LIS, Dec. 2006, XP014039997.

Nokia: "ARQ Operation with HARQ-ARQ Interaction", 3GPP TSG-RAN WG2, R2-062765, Oct. 9, 2006, sections 2-3.

Ericsson: "Uplink HARQ-ARQ Interactions for NACK-> ACK Error", 3GP TSG-RAN WG2, R2-063238, Nov. 6, 2006, fig. 1, p. 2.

Samsung:"MAC functions: ARQ", 3GP TSG-RAN WG2, R2-060374, Feb. 13, 2006, section 2.

Herrmann, C. et al., "Improving Packet Loss Probability in the UMTS High-Speed Downlink", IEEE Vehicular Technology Conference, VTC Fall 2003, Oct. 6, 2003, pp. 2655-2659.

Samsung: "DL Control Channel Structure: Overview", 3GPP TSG-RAN WG1, R1-062534, Oct. 9, 2006, sections 1-4.

Ericsson: "E_UTRA Downlink Control Signaling—Open Issues", 3GPP TSG-RAN WG1, R!-061365, May 8, 2006, section 2.

Rapporteur (Motorola): "Report of E-Mail Discussion: DL Scheduling", 3GPP TSG-RAN WG1, R1-063684, Dec. 12, 2006, section 2, annex C.

LG Electronic: "Downlink control signaling", 3GPP TSG_RAN WG1, R1-063177, Nov. 6, 2006, sections 1-2.

Texas Instruments: "Control Channel Structure and Coding in E-UTRA Downlink", 3GPP TSG-RAN WG1, R1-063220, Nov. 6, 2006, sections 1-5.

Sharp: "UE Identity in L1/L2 Control Signaling for Downlink Scheduling Resource Allocation", 3GPP TSG-RAN WG2, R2-061129, May 8, 2006, sections 1-3.

* cited by examiner

METHOD OF TRANSMITTING AND RECEIVING SCHEDULING INFORMATION IN A WIRELESS COMMUNICATION SYSTEM

This application is a national phase entry of International Application No. PCT/KR2008/000139, filed Jan. 9, 2008 and claims priority to U.S. Provisional Application No. 60/884, 198 filed Jan. 9, 2007 and Korean Patent Application No. 10-2008-0002548 filed Jan. 9, 2008, all of which are hereby incorporated by reference in their entireties.

TECHNICAL FIELD

The present invention relates to a wireless communication system, and more particularly, to a method of transmitting and receiving scheduling information in a wireless communication system.

BACKGROUND ART

In a wireless communication system which uses multiple carriers, such as an orthogonal frequency division multiple access (OFDMA) or a single carrier-frequency division multiple access (SC-FDMA), radio resources are a set of continuous sub-carriers and are defined by a time-frequency region on a two-dimensional sphere. A time-frequency region in the OFDM or OFDMA scheme is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment (UE), or a base station can transmit the time-frequency region to a specific user equipment in a downlink. In order to define such a time-frequency region on the two-dimensional sphere, the number of OFDM symbols and the number of continuous sub-carriers starting from a point having an offset from a reference point should be given.

An evolved universal mobile telecommunications system (E-UMTS) which is currently being discussed uses 10 ms radio frame comprising 20 sub-frames. Namely, a sub-frame has a length of 0.5 ms. A resource block comprises one sub-frame and twelve sub-carriers, each of which is 15 kHz. One sub-frame comprises a plurality of OFDM symbols and a part (for example, first symbol) of the plurality of OFDM symbols can be used for transmission of L1/L2 control information.

Figure 1:
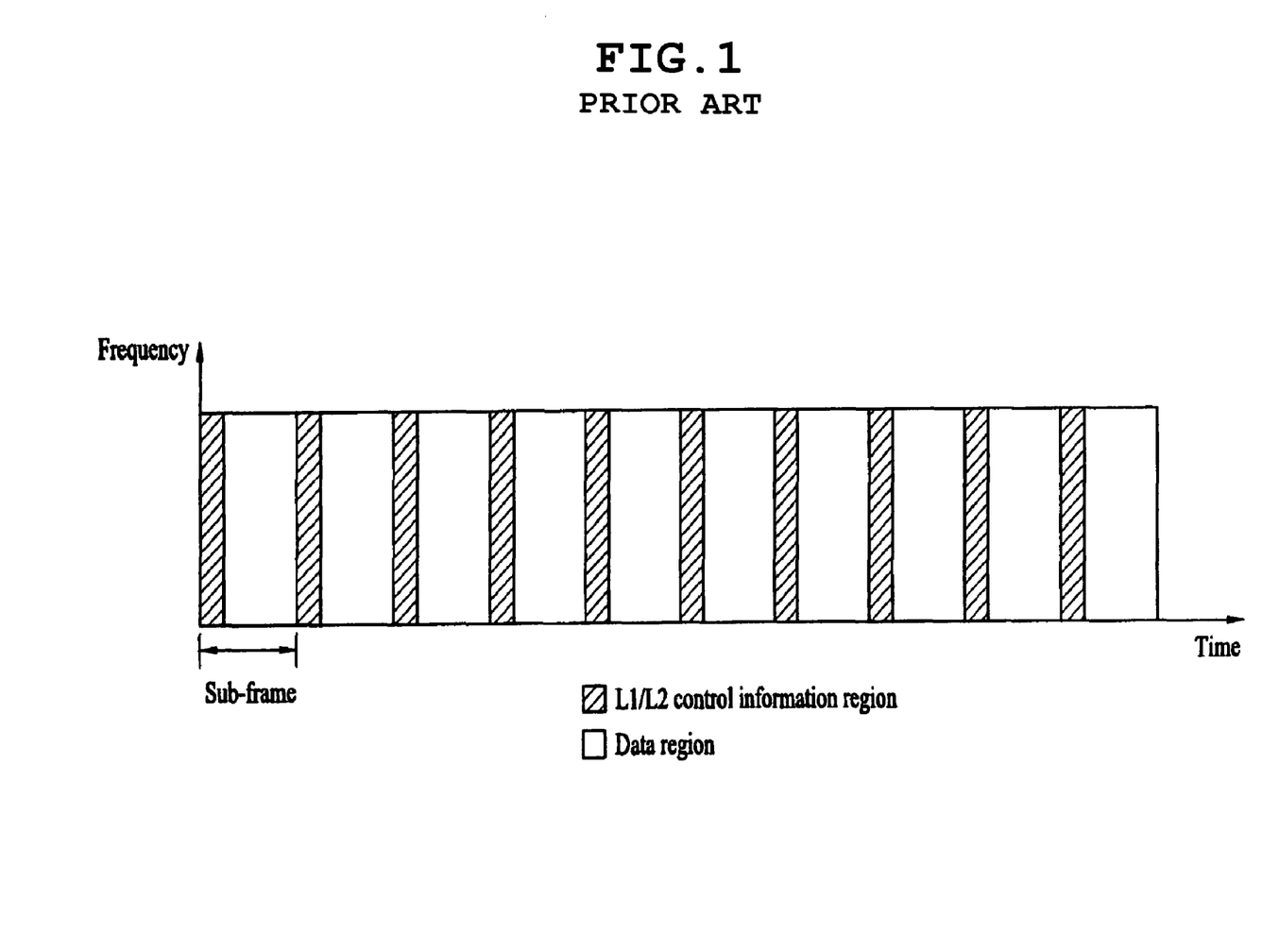
FIG. 1 illustrates an example of a structure of a physical channel used in the E-UMTS (Evolved-Universal Mobile Telecommunications System)

FIG. 1 illustrates an example of a structure of physical channels used in the E-UMTS. In FIG. 1, a sub-frame comprises an L1/L2 control information transmission region (the hatching part) and a data transmission region (the non-hatching part).

Figure 2:
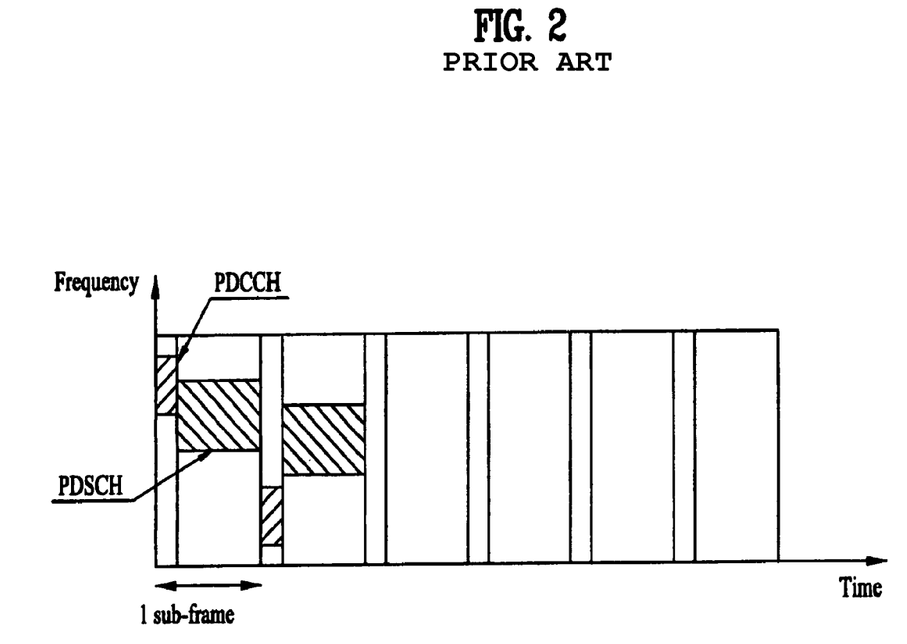
FIG. 2 illustrates a general method of transmitting data in the E-UMTS.

FIG. 2 illustrates a general method of transmitting data in the E-UMTS. In the E-UMTS, a hybrid auto repeat request (HARQ) scheme which is one of data retransmission schemes is used to improve throughput, thereby enabling desirable communication.

Referring to FIG. 2, the base station transmits downlink scheduling information (hereinafter, referred to as 'DL scheduling information') through DL L1/L2 control channel, for example, a physical downlink control channel (PDCCH), to transmit data to a user equipment in accordance with the HARQ scheme. The DL scheduling information includes user equipment identifier (UE ID) or group identifier (group ID) of user equipments, location and duration (resource assignment and duration of assignment) information of radio resources allocated for transmission of downlink data, modulation mode, payload size, transmission parameters such as MIMO related information, HARQ process information, redundancy version, and new data indicator. The location of the radio resources can be expressed by physical resource block (PRB) information. One PRB is a minimum unit of channel resources allocated to the user equipment, and PRB information includes frequency and/or time interval information allocated to the user equipment.

The DL scheduling information can be transferred through the DL L1/L2 control channel even when retransmission is performed. In this case, corresponding information may be changed depending on channel status. For example, if channel status is better than that of initial transmission, the information can be transmitted at a high bit rate by changing the modulation mode or the payload size. By contrast, if channel status is not good, the information can be transmitted at a bit rate lower than that of initial transmission.

The base station transmits user data to the user equipment by using transmission parameters included in the DL scheduling information through channel resources allocated through the DL scheduling information, for example, a physical downlink shared channel (PDSCH) which is a physical channel. The user equipment monitors the PDSCH per transmit time interval (TTI) to identify its DL scheduling information and then receives user data transmitted from the base station by using the DL scheduling information. The user equipment can identify that corresponding scheduling information is transmitted thereto by using UE ID or group ID included in the DL scheduling information.

In the E-UMTS system, a maximum frequency bandwidth used in a downlink is 20 Mhz. At this time, if there are data in a sub-frame, wherein the data are to be transmitted from the base station to the user equipment or are to be received from the user equipment, transmission of downlink or uplink scheduling information for data transmission or reception through the entire radio resources or the entire frequency bandwidths may cause a waste of radio resources. Actually, since the amount of downlink or uplink scheduling information is less than that of information that can be transmitted through the entire radio resources, the related art may cause a waste of radio resources.

Since the user equipment should monitor the entire L1/L2 control information region per sub-frame to receive scheduling information transmitted thereto, a data processing procedure of the user equipment becomes complicated, whereby resources of the user equipment are wasted.

DISCLOSURE OF THE INVENTION

Accordingly, the present invention is directed to a method of transmitting and receiving scheduling information in a wireless communication system, which substantially obviates one or more problems due to limitations and disadvantages of the related art.

An object of the present invention is to provide a method of transmitting and receiving scheduling information in a wireless communication system, in which radio resources are efficiently used to avoid a waste of radio resources.

To achieve these objects and other advantages and in accordance with the purpose of the invention, as embodied and broadly described herein, a method of transmitting scheduling information from a network of a wireless communication system which uses multiple carriers comprises allocating at least one sub-region to a user equipment among an entire control information transmission region used in one cell, the entire control information transmission region comprising at least two sub-regions, and transmitting scheduling information for data to be transmitted to the user equipment, through at least one subregion allocated to the specific user equipment.

In another aspect of the present invention, a method of receiving scheduling information in a user equipment of a wireless communication system using multiple carriers comprises, receiving allocation information indicating at least one sub-region allocated to the user equipment among an entire control information transmission region from a network, the entire control information transmission region comprising a plurality of sub-regions, monitoring the allocated at least one sub-region per designated time, and receiving scheduling information for reception of data transmitted from the network, through the allocated at least one sub-region.

BRIEF DESCRIPTION OF THE DRAWINGS

FIG. 5A and FIG. 5B illustrate a structure of a radio interface protocol between a user equipment (UE) and E-UTRAN, in which FIG. 5A is a schematic view of a control plane protocol and FIG. 5B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 3:
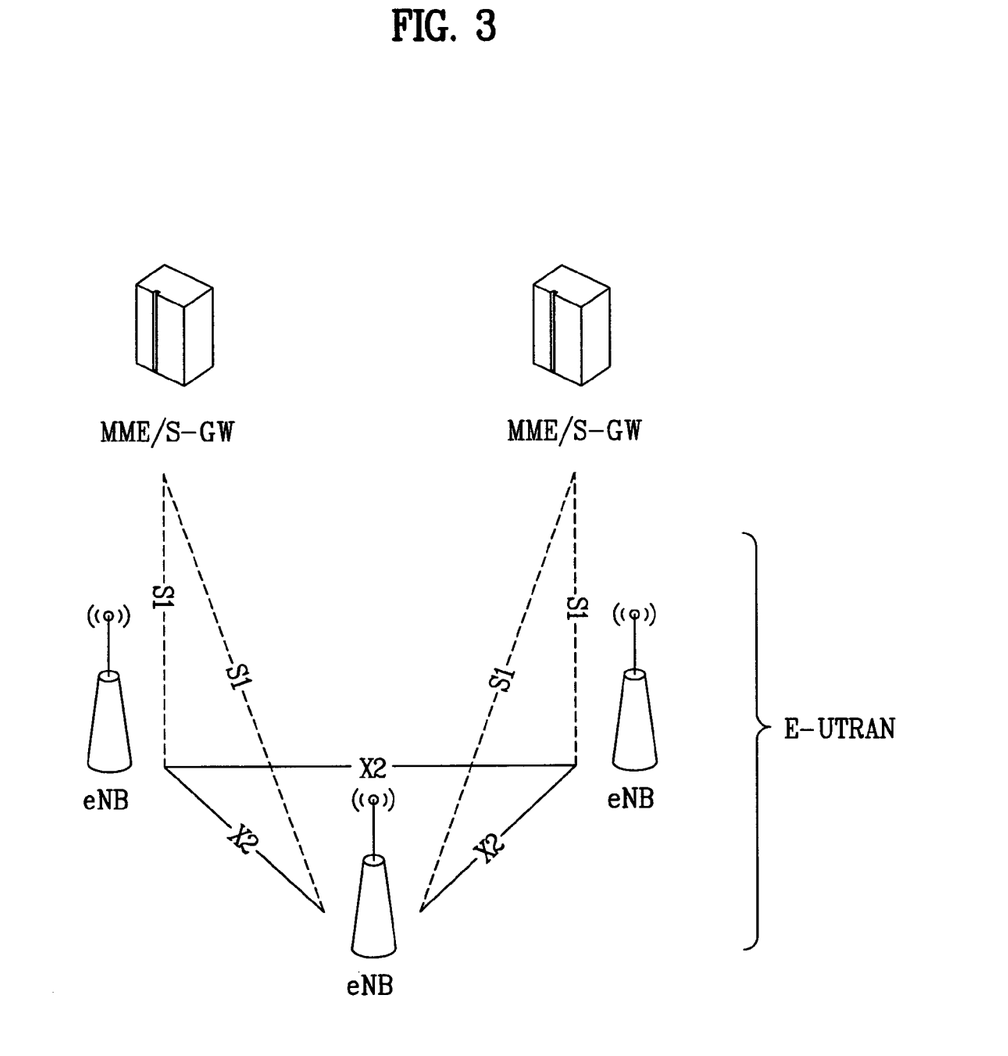
FIG. 3 illustrates a network structure of the E-UMTS.

FIG. 3 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system. [http://www.3gpp.org/ftp/Specs/2006-12/] and [http://www.3gpp.org/ftp/Specs/html-info/GanttChart-Level-2.htm] can be referred to, so as to obtain detailed information about technical specification of the UMTS and E-UMTS.

Referring to FIG. 3, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 4:
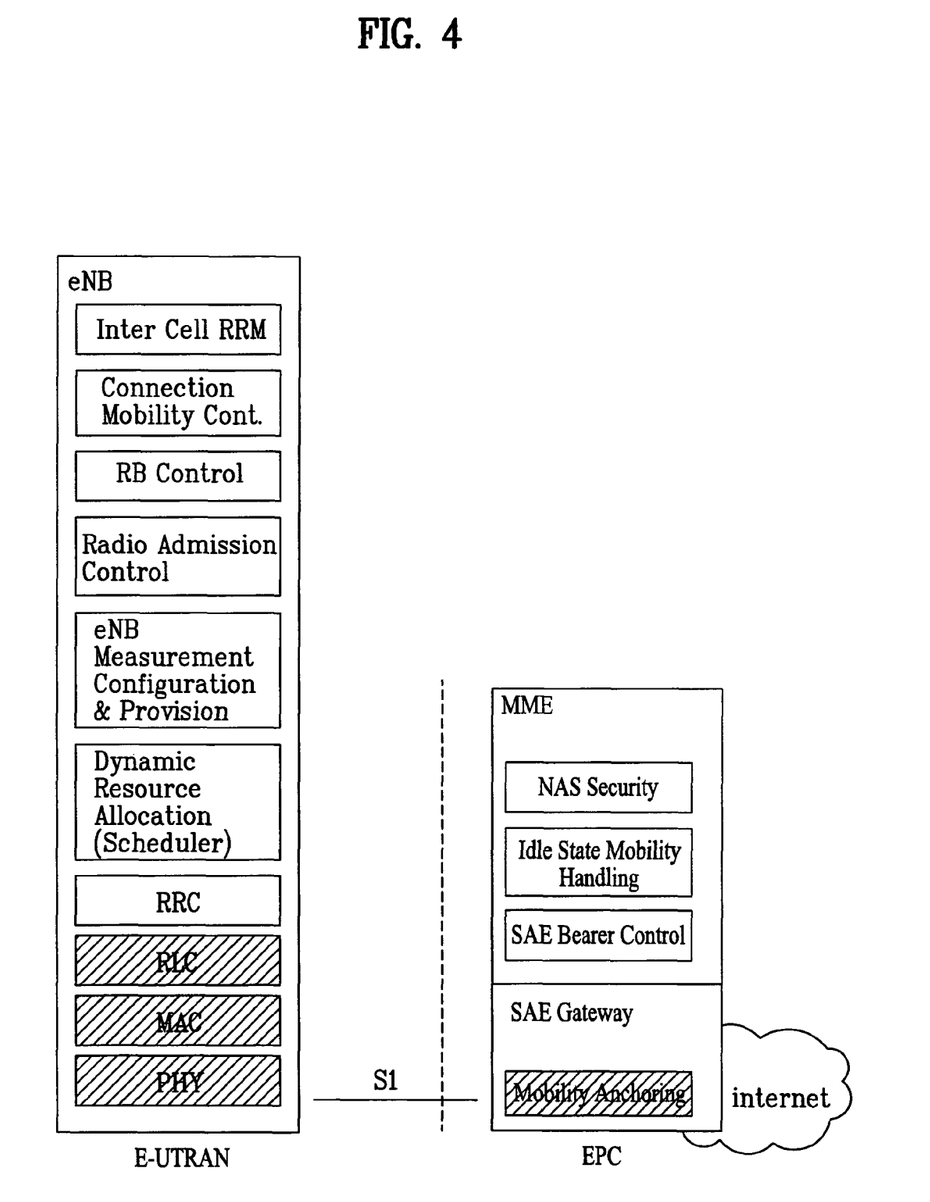
FIG. 4 is a schematic view illustrating the E-UTRAN (Evolved Universal Terrestrial Radio Access Network)

FIG. 4 is a schematic view illustrating an E-UTRAN (UMTS terrestrial radio access network). In FIG. 4, a hatching part represents functional entities of a user plane, and a non-hatching part represents functional entities of a control plane.

Figure 5A:
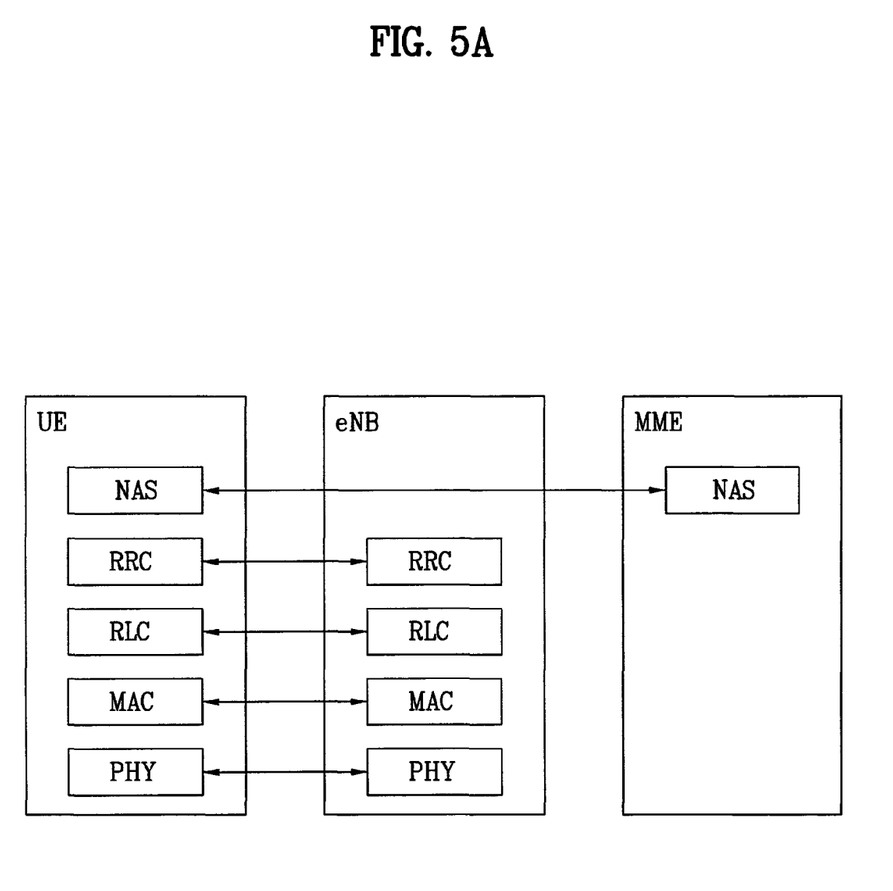
Figure 5B:
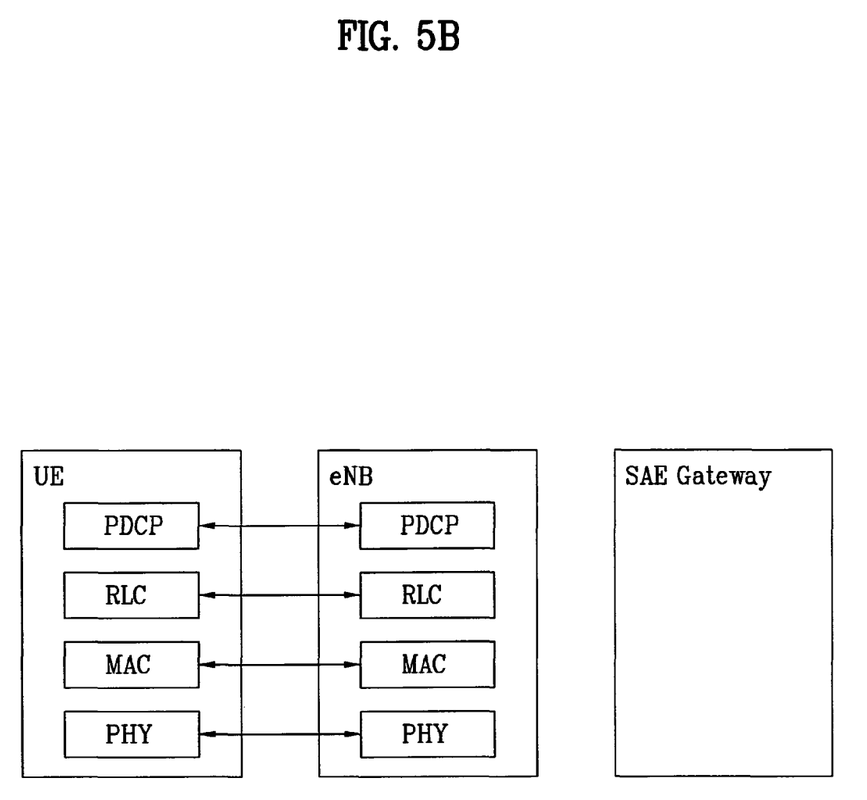

FIG. 5A and FIG. 5B illustrate a structure of a radio interface protocol between the user equipment (UE) and the E-UTRAN, in which FIG. 5A is a schematic view of a control plane protocol and FIG. 3B is a schematic view of a user plane protocol. Referring to FIG. 5A and FIG. 5B, a radio interface protocol horizontally includes a physical layer, a data link layer, and a network layer, and vertically includes a user plane for data information transfer and a control plane for signaling transfer. The protocol layers in FIG. 5A and FIG. 5B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

Figure 6:
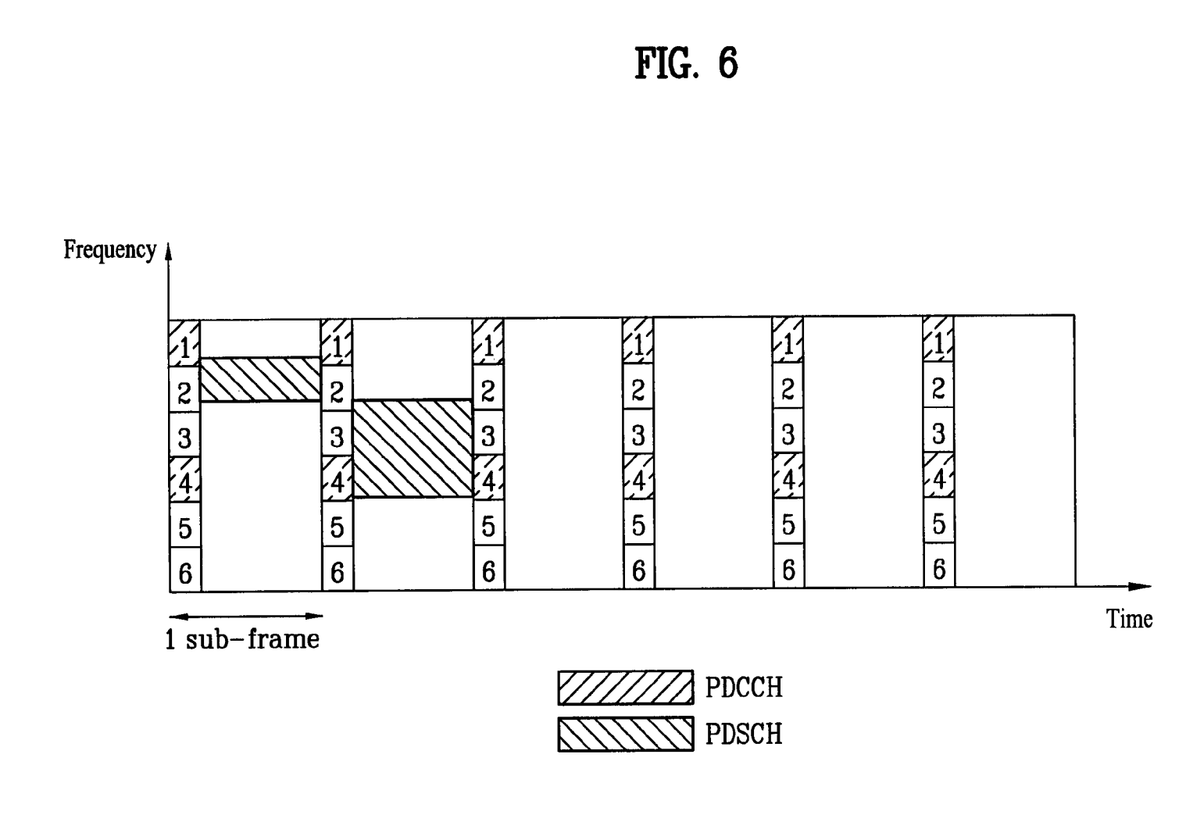
FIG. 6 illustrates a structure of a data frame for an embodiment of the present invention.

FIG. 6 illustrates a structure of a data frame for an embodiment of the present invention.

In FIG. 6, the entire L1/L2 control information transmission region is divided into six sub-regions. In this case, either one subregion can constitute one control channel, for example, one physical downlink control channel (PDCCH), or two or more sub-regions can constitute one control channel. If the two or more sub-regions constitute one control channel, each sub-region can include one information unit. The information unit includes, for example, scheduling information allocated to one user equipment.

The base station allocates at least one sub-region of a plurality of sub-regions constituting the entire L1/L2 control information transmission region to a specific user equipment. For example, in FIG. 6, the first sub-region can be allocated to the first user equipment, the second and third sub-regions can be allocated to the second user equipment, and the fourth sub-region can be allocated to the third user equipment. Allocation of the sub-regions can be performed in a procedure of configuring a call or radio bearer between the user equipment and the base station. Even after a sub-region is allocated to a specific user equipment, the allocated sub-region can be changed depending on change of a radio environment or change of the number of user equipments which perform communication with the base station.

If a sub-region is allocated to a specific user equipment, the user equipment monitors the sub-region allocated per sub-frame so as to check whether there is uplink (UL) or downlink (DL) scheduling information transmitted to the user equipment. When the user equipment receives DL scheduling information through the allocated sub-region, the user equipment receives data, which are transmitted from the base station to the user equipment, through a downlink traffic channel, for example, PDSCH, in accordance with the received DL scheduling information. If the user equipment receives UL scheduling information through the allocated sub-region, the user equipment transmits data to the base station through an uplink traffic channel in accordance with the received UL scheduling information.

Figure 7:
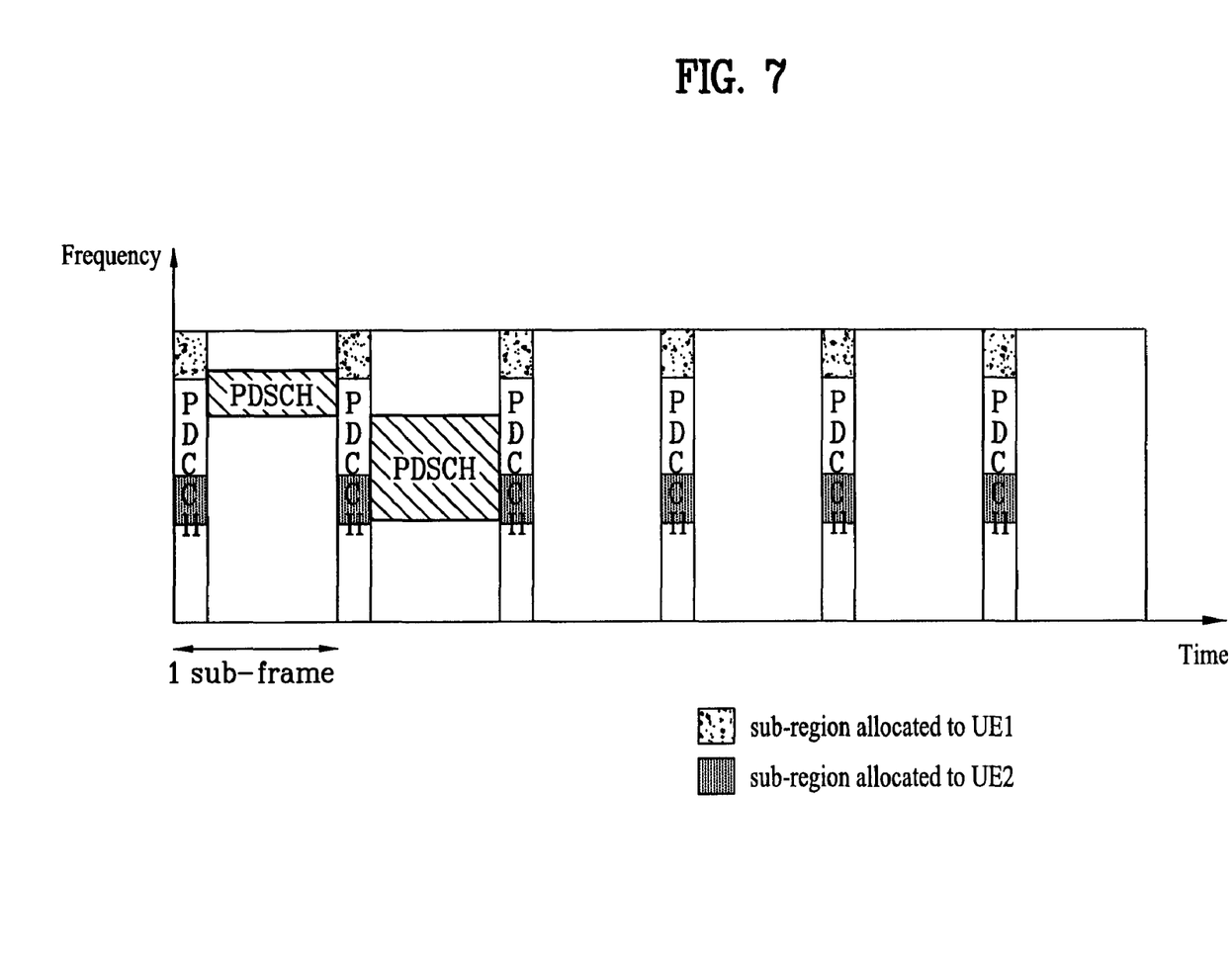
FIG. 7 illustrates a structure of a data frame for another embodiment of the present invention.

FIG. 7 illustrates a structure of a data frame for another embodiment of the present invention. In the embodiment of FIG. 7, one control channel, for example, PDCCH is divided into a plurality of sub-regions, and one information unit is transmitted through either one sub-region or two or more sub-regions. The information unit means a unit which includes scheduling information transmitted to a specific user equipment. At this time, the specific user equipment should receive location information of a sub-region allocated thereto, within one PDCCH, and should in advance know the location information. The location information can be transmitted to the user equipment in a procedure of configuring a call or radio bearer between the user equipment and the base station. The location information can include information indicating the information unit which the user equipment should receive within the PDCCH, and/or information indicating location of data which the user equipment should receive, among data transmitted by being included in the PDCCH, in a bit unit or byte unit. The user equipment can receive DL or UL scheduling information transmitted from the base station by receiving an information unit only transmitted thereto through the location information without receiving the entire of the PDCCH.

Figure 8:
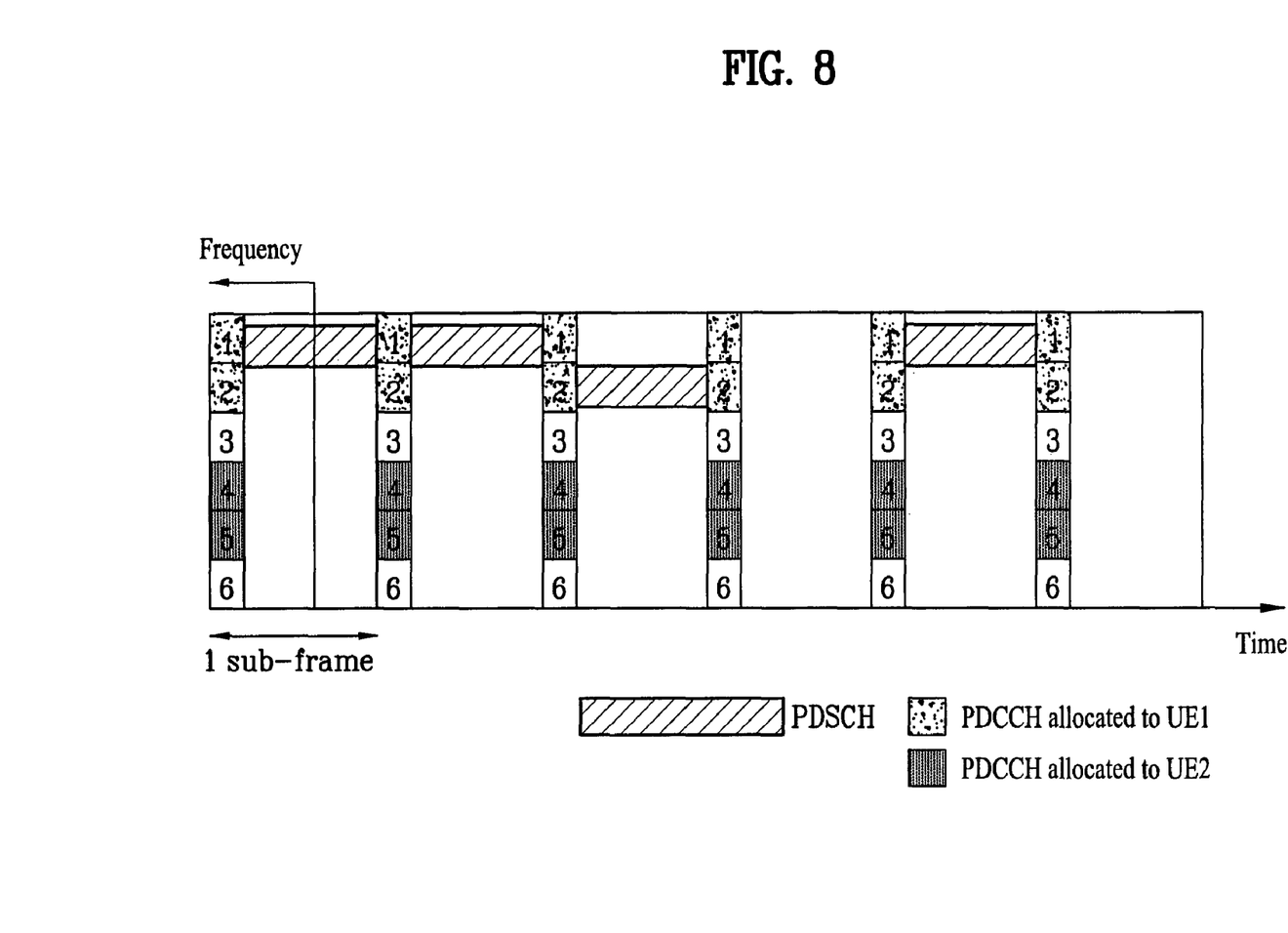
FIG. 8 illustrates a structure of a data frame for still another embodiment of the present invention.

FIG. 8 illustrates a structure of a data frame for still another embodiment of the present invention.

In the embodiment of FIG. 8, the base station can transmit scheduling information to the user equipment in the same manner as the embodiment of FIG. 6 or FIG. 7. However, in the embodiment of FIG. 8, the base station transmits scheduling information through each sub-region constituting the entire control information transmission region, in accordance with a previously set format. Also, in the embodiment of FIG. 8, each sub-region constitutes one PDCCH. Like FIG. 7, the following description can be applied to the case where the PDCCH is divided into a plurality of sub-regions and one information unit is transmitted through either one sub-region or two or more sub-regions.

A format of PDCCH means information required for the user equipment to receive data through each PDCCH, and can include information related to type, contents and analysis method of information transmitted through each PDCCH. In other words, in the embodiment of FIG. 8, a network side previously sets a format of each PDCCH and then reports format information to a user equipment to which a corresponding PDCCH is allocated. The user equipment receives and analyzes scheduling information transmitted through PDCCH in accordance with contents of format information by using the format information of the PDCCH allocated from the base station. And, the user equipment receives data transmitted from the base station in accordance with the scheduling information or transmits uplink data to the base station. The format information can be transmitted to the user equipment in a procedure of configuring a call or radio bearer between the user equipment and the base station.

In FIG. 8, it is supposed that PDCCH1 and PDCCH2 are allocated to the first user equipment UE1 to transmit scheduling information. The first user equipment UE1 receives PDCCH1 and PDCCH2 by using format information previously allocated from the base station per sub-frame. Since the first user equipment UE1 previously knows format information of PDCCH1 and PDCCH2, it can easily receive PDCCH1 and PDCCH2 in accordance with corresponding format information. In this case, the base station can set location of channel resources allocated through PDCCH1 and PDCCH2, for example, PDSCH1 and PDSCH, and then can previously report the location of the channel resources to the first user equipment UE1. For example, when the base station reports format information of PDCCH1 and PDCCH2 to the first user equipment UE1, it can report it to the first user equipment UE1 along with location information (ex, PRB information) of PDSCH1 and PDSCH2. In this way, the base station may not include location information of PDSCH1 and PDSCH2 allocated to the first user equipment UE1 through PDCCH1 and PDCCH1. In other words, if the first user equipment UE1 receives scheduling information through PDCCH1, since the first user equipment UE1 knows location information of a corresponding PDSCH1, the first user equipment UE1 can receive downlink data or transmit uplink data through the corresponding PDSCH1 by using the received scheduling information.

For another example, if another information other than location information of channel resources allocated to the user equipment UE1, among scheduling information transmitted from the base station through PDCCH1 and PDCCH2, is not changed per sub-frame, the base station can reduce the amount of information included in PDCCH1 and PDCCH2 by previously reporting corresponding information to the first user equipment UE1. For example, if the base station transmits scheduling information of a traffic channel, in which at least one of transmission parameters such as modulation and coding scheme (MCS) level), payload size, and MIMO related information is fixed, among scheduling information, the base station can transmit scheduling information to the user equipment without including information related to corresponding transmission parameters by previously reporting the fixed transmission parameter information to the user equipment. Moreover, if every scheduling information for a specific user equipment is not changed per sub-frame, the base station can previously report the scheduling information to the specific user equipment and transmit the information through a sub-region allocated to the specific user equipment by including an identifier only of the specific user equipment. If the specific user equipment receives its identifier through PDCCH allocated thereto, the specific user equipment can receive downlink data or transmit uplink data through a corresponding DPSCH by using scheduling information which is previously known.

Figure 9:
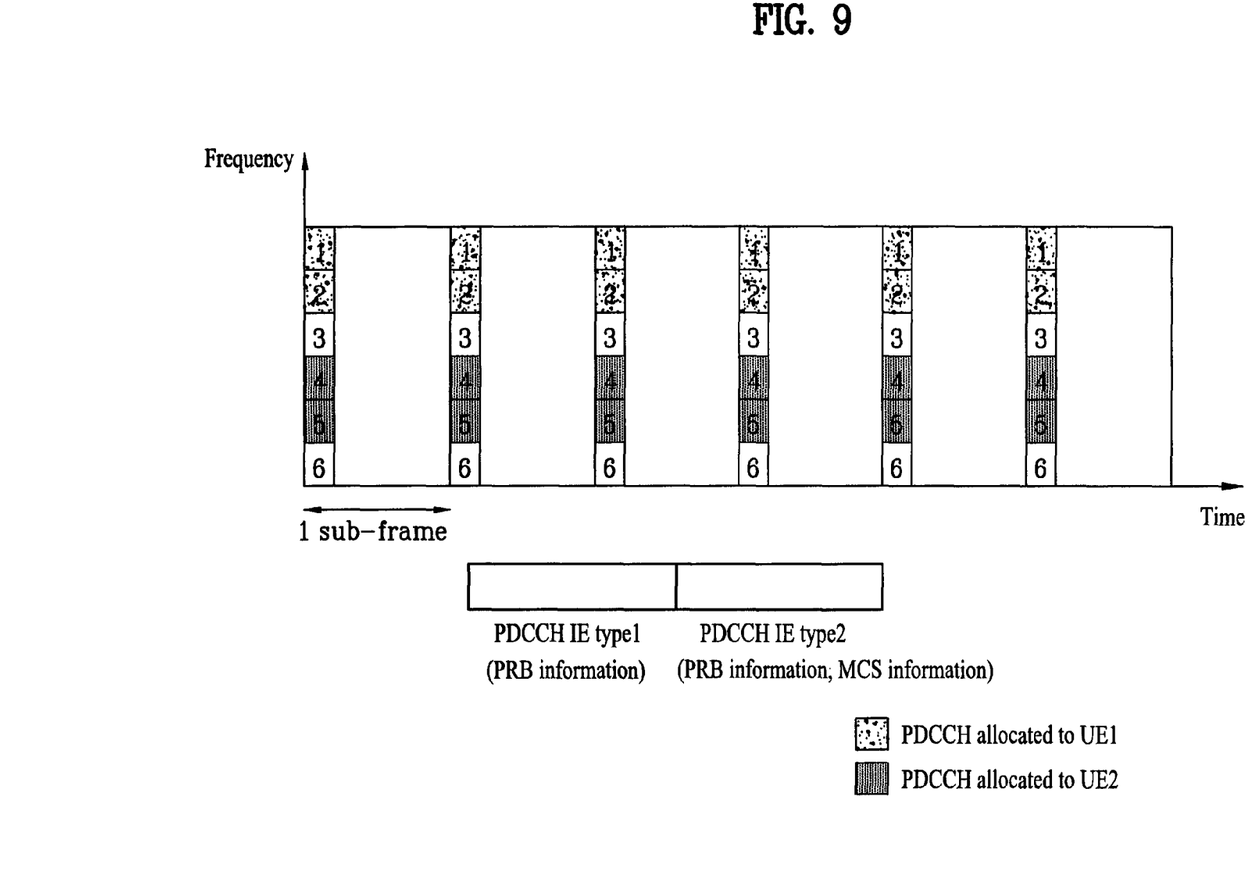
FIG. 9 illustrates a structure of a data frame for further still another embodiment of the present invention.

FIG. 9 illustrates a structure of a data frame for further still another embodiment of the present invention.

In the embodiment of FIG. 9, the base station can transmit scheduling information to the user equipment basically referring to the embodiment described in FIG. 6 or FIG. 7. In the embodiment of FIG. 9, at least two or more sub-regions or PDCCHs are allocated to each user equipment. Among two or more PDCCHs allocated to the specific user equipment, the base station previously reports format information of each PDCCH and an analysis method according to location of each PDCCH to the specific user equipment. The user equipment analyzes information received through PDCCHs referring to a previously set analysis method depending on whether the user equipment has received information through what PDCCH of two or more PDCCHs or the user equipment has received information by combination of what PDCCHs.

In FIG. 9, PDCCH1 and PDCCH2 are allocated to the first user equipment UE1. In this case, there are three types of combinations, i.e., the case where the base station transmits scheduling information to the first user equipment UE1 by using only PDCCH1 in combination of used channels, the case where the base station transmits scheduling information to the first user equipment by using only PDCCH2, and the case where the base station transmits scheduling information to the first user equipment UE1 by using both PDCCH1 and PDCCH2. The base station previously reports each information analysis method or previously set meaning of the above three types of combinations to the first user equipment UE1 in a procedure of configuring a call or radio bearer. The first user equipment UE1 performs a previously set operation, analyzes information in accordance with a previously set manner, or transmits and receives data by using previously set information depending on whether the first user equipment has received PDCCH in accordance with which one of the three types of combinations.

Furthermore, the base station previously reports to the specific user equipment each region within PDCCH, an analysis method according to location of each region, transmission combination of sub-regions within PDCCH, combination of each sub-region within PDCCH, or combination of locations of sub-regions and each analysis method. The user equipment analyzes and uses information of received PDCCH depending on whether information has been transmitted in accordance with what combination through what region within PDCCH or what location of the region.

Furthermore, only an identifier of the user equipment to which radio resources will be allocated can be transmitted through PDCCHs or a specific location of a sub-region within the PDCCH. In this case, the user equipment can use radio resources in a previously set manner based on combination of locations where its identifier has been found or combination of channels.

The user equipment should classify the case where allocation information of radio resources related to transmission and reception of data dedicated for the user equipment from allocation information of radio resources related to transmission and reception of common data commonly applied to a plurality of user equipments or all user equipments. For example, in case of transmission and reception of dedicated data, PRB information or MCS information, which is used, may be changed every time. However, in case of transmission and reception of common data, PRB information or MCS information, which is used, is little changed. Accordingly, in this case, PRB information or MCS information may be omitted or may previously be reported to the user equipment to reduce a waste of radio resources. In other words, type or analysis method of information included in PDCCH is changed depending on the number of user equipments to which radio resources are allocated or types of user equipments. As described above, one PRB is a minimum unit of channel resources allocated to the user equipment, and PRB information may include frequency and/or time interval information allocated to the user equipment.

To this end, the base station reports PDCCH to which allocation information of radio resources related to transmission and reception of common or dedicated data is allocated, region within PDCCH, or location within PDCCH, to the user equipment. The user equipment analyzes the information in accordance with a manner designated by type of PDCCH, or region or location within PDCCH.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, it is possible to reduce the amount of control information for transmission and reception of data and thus efficiently use radio resources.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

The invention claimed is:

1. A method of performing a procedure for transmitting PDCCH signal from a network of a wireless communication system, the method comprising transmitting a subframe including a control information transmission region, wherein the control information transmission region comprises starting OFDM symbols and includes a plurality of sub-control regions;

identifying a partial set of the plurality of sub-control regions, which are allocated to user equipment (UE); and transmitting the PDCCH signal for the UE via the partial set of entire the plurality of sub-control regions;

wherein the PDCCH signal includes scheduling information for the UE, and wherein each sub-control region constituting the control information transmission region is an independent control channel.

2. The method of claim 1, wherein at least two sub-control regions constitute one control channel.

3. The method of claim 1, wherein the scheduling information for data to be transmitted to the user equipment is transmitted periodically or non-periodically through the at least one sub-control region allocated to the specific user equipment.

4. The method of claim 1, wherein the sub-control regions allocated to different user equipments are set to have different data formats.

5. The method of claim 4, further comprising transmitting interpretation information of a data format for the sub-control regions, which are allocated to the user equipment, to the user equipment.

6. The method of claim 1, wherein the sub-control regions allocated to the user equipment at different transmission time intervals are set to have a single data format.

7. A method of performing a procedure for receiving PDCCH signal at a user equipment in a wireless communication system, the method comprising:

receiving a subframe including a control information transmission region, wherein the control information transmission region comprises starting OFDM symbols and includes a plurality of sub-control regions;

monitoring only a partial set of the plurality of sub-control regions for receiving the PDCCH signal;

identifying, in the monitored partial set of the plurality of sub-control regions at least one sub-control region allocated to the user equipment;

receiving scheduling information for the user equipment, through the allocated at least one sub-control region; and if scheduling information allocated to the user equipment is detected in the allocated at least one sub-control region, performing an operation in accordance with the scheduling information, wherein each sub-control region constituting the control information transmission region is an independent control channel.

8. The method of claim 7, wherein at least two sub-control regions constitute one control channel.

9. The method of claim 7, wherein the at least one sub-control region allocated to the user equipment for different sub-frames has a single format.

10. The method of claim 9, further comprising receiving interpretation information of a format for the at least one sub-control region from the network.

11. The method of claim 10, wherein the interpretation information is received in a procedure of configuring a call or radio bearer with the network.

* * * * *